(12) United States Patent
Eleazer (10) Patent No.: US 9,643,382 B2
(45) Date of Patent: May 9, 2017

(54) FIBER REINFORCED STRUCTURAL ELEMENT

(71) Applicant: MILLIKEN & COMPANY, Spartanburg, SC (US)

(72) Inventor: Howell B. Eleazer, Chesnee, SC (US)

(73) Assignee: Milliken & Company, Spartanburg, SC (US)

( * ) Notice: Subject to any disclaimer, the term of this patent is extended or adjusted under 35 U.S.C. 154(b) by 487 days.

(21) Appl. No.: 14/265,676

(22) Filed: Apr. 30, 2014

(65) Prior Publication Data

US 2014/0329429 A1    Nov. 6, 2014

Related U.S. Application Data (60) Provisional application No. 61/819,894, filed on May 6, 2013.

(51) Int. Cl.
*B32B 5/02*    (2006.01)
*B32B 27/12*   (2006.01)
(Continued)

(52) U.S. Cl.
CPC ............... *B32B 5/024* (2013.01); *B32B 5/26* (2013.01); *B32B 7/08* (2013.01); *B32B 27/08* (2013.01);
(Continued)

(58) Field of Classification Search
None
See application file for complete search history.

(56) References Cited

U.S. PATENT DOCUMENTS

| | | | |
|---|---|---|---|
| 3,627,605 A | 12/1971 | Taylor | 156/148 |
| 4,309,487 A | 1/1982 | Holmes | 428/516 |

(Continued)

FOREIGN PATENT DOCUMENTS

| | | |
|---|---|---|
| DE | 198 23 926 | 12/1999 |
| EP | 0 733 460 | 9/1996 |

(Continued)

OTHER PUBLICATIONS

Patent Cooperation Treaty PCT International Search Report. Date of Mailing, Aug. 28, 2014, International Application No. PCT/US2014/036020. International Filing Date, Apr. 30, 2014.

*Primary Examiner* — Elizabeth M Cole
*Assistant Examiner* — Shawnda McKinnon
(74) *Attorney, Agent, or Firm* — Cheryl J. Brickey (57) ABSTRACT

A fiber reinforced structural element comprising a thermoplastic fiber reinforced member, a non-thermoplastic fiber reinforced member, and a multi-layer woven tie layer. The thermoplastic fiber reinforced member contains at least one layer of thermoplastic fibers and the non-thermoplastic fiber reinforced member contains at least one layer of non-thermoplastic fibers. The multi-layer woven tie layer contains at least a first woven ply and a second woven ply, where the woven plies are integrated through combined portions formed by interlacing warps or wefts of adjacent woven plies. The multi-layer woven tie layer is oriented such that the upper surface of the multi-layer woven tie layer which is predominately thermoplastic fibers is adjacent the thermoplastic fiber reinforced member and the lower surface of the multi-layer woven tie layer which is predominately non-thermoplastic fibers is adjacent the non-thermoplastic fiber reinforced member.

14 Claims, 4 Drawing Sheets

(51) Int. Cl.
   *B32B 27/08*  (2006.01)
   *B32B 5/26*   (2006.01)
   *B32B 7/08*   (2006.01)

(52) U.S. Cl.
   CPC .......... *B32B 27/12* (2013.01); *B32B 2250/20* (2013.01); *B32B 2260/023* (2013.01); *B32B 2260/046* (2013.01); *B32B 2262/101* (2013.01); *B32B 2305/07* (2013.01); *Y10T 442/3504* (2015.04)

(56) References Cited

U.S. PATENT DOCUMENTS

| | | | |
|---|---|---|---|
| 4,316,933 A | 2/1982 | Fraser | 428/17 |
| 4,407,885 A | 10/1983 | Murphy et al. | 442/212 |
| 4,426,415 A | 1/1984 | Avery | 428/17 |
| 4,705,706 A | 11/1987 | Avery | 428/17 |
| 4,980,227 A | 12/1990 | Sekiguchi et al. | 442/3 |
| 5,124,195 A | 6/1992 | Harpell et al. | 428/152 |
| 5,437,905 A | 8/1995 | Park | 428/105 |
| 5,443,882 A | 8/1995 | Park | 428/103 |
| 5,443,883 A | 8/1995 | Park | 428/103 |
| 5,529,826 A | 6/1996 | Tailor et al. | 428/110 |
| 5,547,536 A | 8/1996 | Park | 156/292 |
| 5,578,370 A | 11/1996 | Ferrar et al. | 428/288 |
| 5,635,288 A | 6/1997 | Park | 428/105 |
| 5,643,390 A | 7/1997 | Don et al. | 156/307.1 |
| 5,840,637 A | 11/1998 | Denton et al. | 442/361 |
| 5,861,202 A | 1/1999 | Kimura et al. | 428/105 |
| 5,879,492 A | 3/1999 | Reis et al. | 156/72 |
| 5,888,915 A | 3/1999 | Denton et al. | 442/200 |
| 5,925,434 A | 7/1999 | Phillips et al. | 428/95 |
| 5,935,651 A | 8/1999 | Klocek et al. | 427/256 |
| 5,935,678 A | 8/1999 | Park | 428/105 |
| 5,962,101 A | 10/1999 | Irwin, Sr. et al. | 428/92 |
| 6,054,086 A | 4/2000 | Kurihara et al. | 264/147 |
| 6,083,583 A | 7/2000 | Klocek et al. | 428/182 |
| 6,127,293 A | 10/2000 | Kimura et al. | 442/199 |
| 6,147,018 A | 11/2000 | Chiou | 442/243 |
| 6,156,679 A | 12/2000 | Takaoka et al. | 442/327 |
| 6,312,638 B1 | 11/2001 | Ward et al. | 264/322 |
| 6,328,923 B1 | 12/2001 | Jones et al. | 264/494 |
| 6,458,727 B1 | 10/2002 | Jones et al. | 442/409 |
| 6,475,592 B1 | 11/2002 | Irwin | 428/95 |
| 6,479,125 B1 | 11/2002 | Irwin, Sr. | 428/95 |
| 6,509,105 B2 | 1/2003 | Olvey | 428/481 |
| 6,645,610 B1 | 11/2003 | Reis et al. | 428/297.4 |
| 6,740,386 B2 | 5/2004 | Hutchison | 428/88 |
| 6,824,863 B1 | 11/2004 | Kitayama et al. | 428/299.7 |
| 6,866,912 B2 | 3/2005 | Higgins et al. | 428/95 |
| 6,897,170 B2 | 5/2005 | Barkis et al. | 442/195 |
| 6,949,280 B2 | 9/2005 | Brillhart, III et al. | 428/105 |
| 7,160,599 B2 | 1/2007 | Hartman | 428/95 |
| 7,294,383 B2 | 11/2007 | Callaway et al. | 428/86 |
| 7,294,384 B2 | 11/2007 | Eleazer et al. | 428/86 |
| 7,300,691 B2 | 11/2007 | Callaway et al. | 428/86 |
| 7,378,359 B2 | 5/2008 | Eleazer | 442/4 |
| 7,892,379 B2 | 2/2011 | Eleazer et al. | 156/182 |
| 8,211,268 B1 | 7/2012 | Raghavendran et al. | 156/308.2 |
| 2003/0175474 A1 | 9/2003 | Higgins et al. | 428/95 |
| 2003/0175475 A1 | 9/2003 | Higgins et al. | 428/95 |
| 2003/0224143 A1 | 12/2003 | Ianniello et al. | 428/137 |
| 2004/0242103 A1 | 12/2004 | Loos et al. | 442/185 |
| 2005/0003727 A1 | 1/2005 | Chiou | 442/239 |
| 2005/0233107 A1 | 10/2005 | Hartman | 428/95 |
| 2006/0151104 A1 | 7/2006 | Jacobs et al. | 156/308.2 |
| 2007/0071960 A1 | 3/2007 | Eleazer et al. | 428/297.7 |
| 2007/0122588 A1 | 5/2007 | Milburn | 428/95 |
| 2010/0183836 A1 | 7/2010 | Wangenheim | 428/36.1 |

FOREIGN PATENT DOCUMENTS

| | | |
|---|---|---|
| EP | 0 733 476 | 9/1996 |
| EP | 0 872 586 | 10/1998 |
| EP | 1 021 338 | 6/2002 |
| EP | 1 650 021 | 4/2006 |
| GB | 1202191 A | 5/1966 |
| GB | 1387701 | 3/1975 |
| JP | 62 90317 | 4/1987 |
| JP | 07300763 | 11/1995 |
| JP | 10251956 | 9/1998 |
| JP | 2000008244 | 1/2000 |
| JP | 2000045147 A | 2/2000 |
| WO | WO 89/05367 | 12/1989 |
| WO | WO 98/12370 | 3/1998 |
| WO | WO 98/12371 | 3/1998 |
| WO | WO 02/101319 | 2/2000 |
| WO | WO 02090082 | 11/2002 |
| WO | WO 2003008190 | 1/2003 |
| WO | WO 2003045659 | 6/2003 |
| WO | WO 2004028803 | 4/2004 |
| WO | WO 2006046862 | 5/2006 |

FIBER REINFORCED STRUCTURAL ELEMENT

RELATED APPLICATIONS

This application claims priority to U.S. provisional patent application No. 61/819,894, filed May 6, 2013 entitled "Fiber Reinforced Structural Element".

TECHNICAL FIELD

The present disclosure generally relates to tie layers for forming a structural element from a thermoplastic fiber reinforced member and a non-thermoplastic fiber reinforced member.

BACKGROUND

The goal of bonding the same, similar or totally dissimilar layers of fiber reinforced members is to provide a laminate product of reliable and durable performance poses a problem of materials engineering for which a practical and effective solution is often elusive. Even after relatively brief periods of service, contact adhesives frequently fail with consequent delamination of the component layers of the laminate article. There is a need for a tie layer to adhere a thermoplastic fiber reinforced member with a non-thermoplastic fiber reinforced member.

BRIEF SUMMARY

Provided is a fiber reinforced structural element comprising a thermoplastic fiber reinforced member, a non-thermoplastic fiber reinforced member, and a multi-layer woven tie layer. The thermoplastic fiber reinforced member contains at least one layer of thermoplastic fibers and the non-thermoplastic fiber reinforced member contains at least one layer of non-thermoplastic fibers. The multi-layer woven tie layer contains at least a first woven ply and a second woven ply, where the woven plies are integrated through combined portions formed by interlacing warps or wefts of adjacent woven plies. The multi-layer woven tie layer is oriented such that the upper surface of the multi-layer woven tie layer which is predominately thermoplastic fibers is adjacent the thermoplastic fiber reinforced member and the lower surface of the multi-layer woven tie layer which is predominately non-thermoplastic fibers is adjacent the non-thermoplastic fiber reinforced member. Method of making the fiber reinforced structural member are also disclosed.

BRIEF DESCRIPTION OF THE DRAWINGS

An exemplary embodiment of the present invention will now be described by way of example, with reference to the accompanying drawings, wherein.

DETAILED DESCRIPTION

Figure 1:
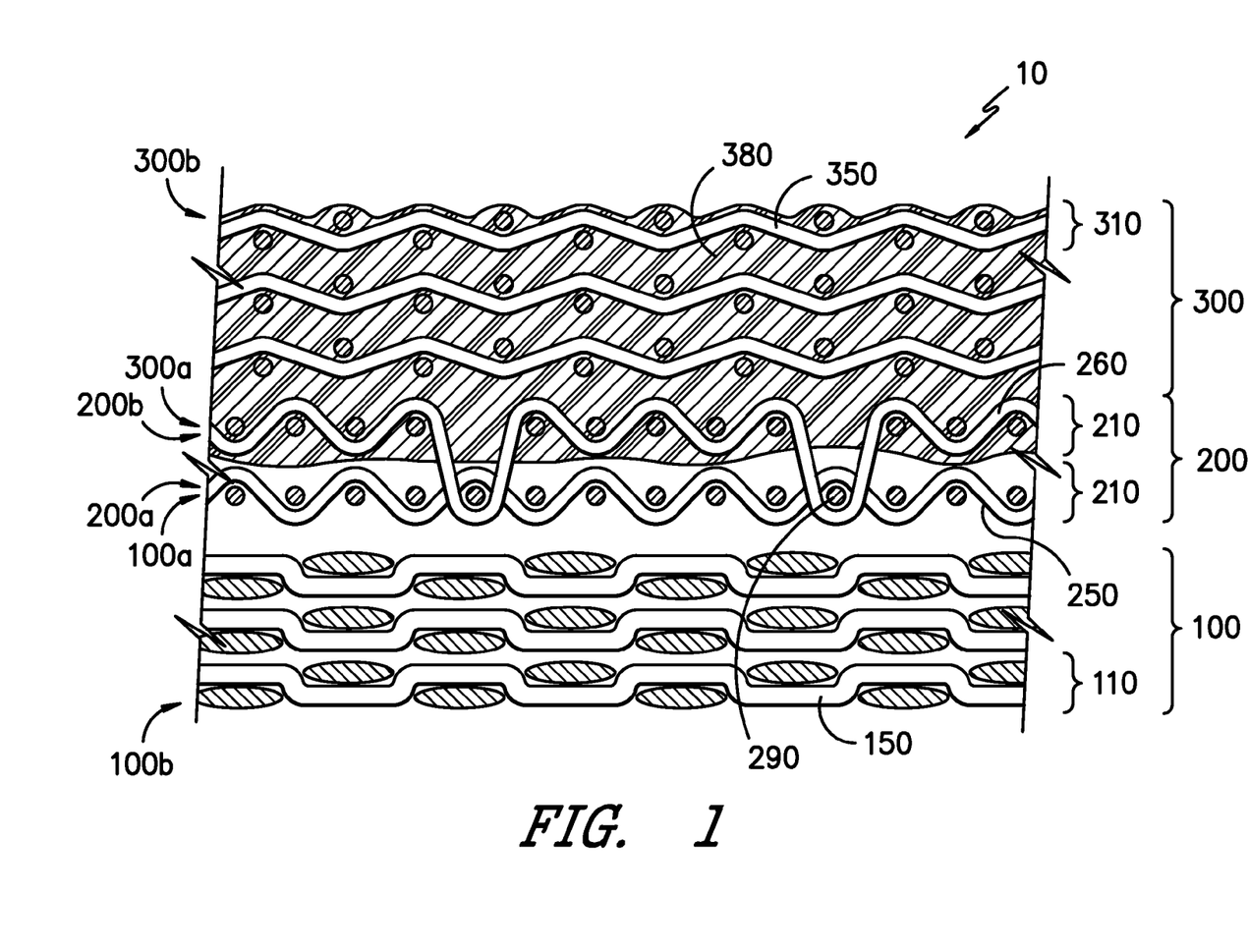
FIG. 1 is an illustration of one embodiment having a thermoplastic fiber reinforced member, a multi-layer woven tie layer, and a non-thermoplastic fiber reinforced member.

Referring now to FIG. 1, there is shown a fiber reinforced structural element 10 containing a thermoplastic fiber reinforced member 100, a multi-layer woven tie layer 200, and a non-thermoplastic fiber reinforced member 300. The multi-layer woven tie layer 200 serves to join the thermoplastic fiber reinforced member 100 and the non-thermoplastic fiber reinforced member 300 together.

The thermoplastic fiber reinforced member 100 contains at least one layer 110, each of the layer(s) containing thermoplastic fibers 150. The thermoplastic fiber reinforced member 100 has an upper surface 100a and a lower surface 100b. The thermoplastic fiber reinforced member 100 may contain any number of layers 110, depending on the end use application. A few as one or two layers 110 may be present or greater than 100 layers may be present. Preferably, multiple layers are present. In one embodiment, the thermoplastic fiber reinforced member 100 contains at least 2 layers 110, more preferably at least 5 layers, more preferably more than 10 layers. In another embodiment, the thermoplastic fiber reinforced member 100 contains more than 50 layers, more preferably more than 100 layers, more preferably between 10 and 100 layers. In another embodiment, the thickness of the thermoplastic fiber reinforced member 100 is between about 0.1 and 3 inches.

Each of the layers 110 contains thermoplastic fibers 150. The layer may be any suitable layer formation of the fibers including a mass of fibers or a textile. When the layer is a textile, any suitable textile may be used, including a knit, woven, non-woven, or unidirectional textile. The textile may have additional function chemistries such as fire resistance, adhesion, or color added. The chemistries may be added to the fibers during fiber formation or applied onto the fibers before or after textile formation.

In one embodiment, the textile is a woven textile. The textile may also be, for example, plain, satin, twill, basket-weave, poplin, jacquard, and crepe weave textiles. Preferably, the woven textile is a plain weave textile. It has been shown that a plain weave has good abrasion and wear characteristics. A twill weave has been shown to have good properties for compound curves so may also be preferred for some applications. A woven textile preferably includes a multiplicity of warp and weft elements interwoven together such that a given weft element extends in a predefined crossing pattern above and below the warp element. Thus, the terms "woven" and "interwoven" are meant to include any construction incorporating interengaging formation of fibers.

In another embodiment, the textile is a knit, for example a circular knit, reverse plaited circular knit, double knit, single jersey knit, two-end fleece knit, three-end fleece knit, terry knit or double loop knit, weft inserted warp knit, warp knit, and warp knit with or without a micro-denier face.

In another embodiment, the textile is a multi-axial, such as a tri-axial textile (knit, woven, or non-woven). In another embodiment, the textile is a bias textile. In another embodiment, the textile is a non-woven textile. The term non-woven refers to structures incorporating a mass of yarns that are entangled and/or heat fused so as to provide a coordinated structure with a degree of internal coherency. Non-woven textiles for use as the textile may be formed from many processes such as for example, meltspun processes, hydroentangeling processes, mechanically entangled processes, stitch-bonded and the like. In another embodiment, the textile is a unidirectional textile and may have overlapping yarns or may have gaps between the fibers.

As will be understood by those of ordinary skill in the art, the fiber layers 110 in the member 100 can be independently provided in each of the aforementioned suitable constructions. For example, the thermoplastic fiber reinforced member 100 may have five (5) layers 110 in a knit construction and five (5) layers 110 in a woven construction. The different constructions may be grouped together, arranged in a repeating pattern or arranged randomly.

Each of the layers 110 contains thermoplastic fibers 150 (though each layer may also contain additional thermoplastic fibers and/or additional fibers being non-thermoplastic depending on the end use). As used herein, "fiber" denotes an elongate body, the length dimension of which is much greater than the transverse dimensions of width and thickness. Accordingly, "fiber" includes monofilament, multifilament, ribbon, yarn, tape, strip, staple and other forms of chopped, cut or discontinuous fiber and the like having regular or irregular cross-sections. The cross-sections of the fibers for use in this invention may vary widely. They may be circular, flat or oblong in cross-section. They also may be of irregular or regular multi-lobal cross-section having one or more regular or irregular lobes projecting from the linear or longitudinal axis of the filament. "Fiber" includes a plurality of any one of the above or a combination of the above.

The thermoplastic fibers 150 may be any suitable thermoplastic, but are preferably made up of high strength thermoplastic fibers. Useful high strength fibers include polyolefin fibers (including polypropylene and polyethylene), polyamide, aramid (including meta and para forms), rayon, PVA (polyvinyl alcohol), polyester, polyvinyl, nylon (including nylon 6, nylon 6,6, and nylon 4,6), polyethylene naphthalate (PEN), polytrimethylene terephthalate (PTT), polycyclohexane dimethylene terephthalate (PCT), polybutylene terephthalate (PBT), PET modified with polyethylene glycol (PEG), polylactic acid (PLA), polytrimethylene terephthalate, nylons (including nylon 6 and nylon 6,6), elastomeric materials such as spandex, polyaramids, and polyimides.

In one embodiment, the thermoplastic fibers 150 comprise high tenacity and high modulus fibers, which refers to fibers that exhibit a relatively high ratio of stress to strain when placed under tension, preferably having a tenacity of about 8 or more grams per denier. Thermoplastic fibers 150 suitable for use in the fibers made from highly oriented polymers, such as gel-spun ultrahigh molecular weight polyethylene fibers (e.g., SPECTRA® fibers from Honeywell Advanced Fibers of Morristown, N.J. and DYNEEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kansas), and sintered polyethylene fibers (e.g., TENSYLON® fibers from ITS of Charlotte, N.C.), In the embodiments where the fibers 150 may not adhere well to each other, a skin layer of a lower melt polymer may be used over the fiber or additional adhesive may be introduced within the layers 110 or between the layers 110.

In one embodiment, the thermoplastic fibers 150 are preferably monoaxially drawn and are preferably tape or monofilament fibers. The thermoplastic fibers 150 may be monofilament or have a sheath or coating of a thermoplastic. This outer layer of thermoplastic helps fuse together the thermoplastic fibers 150 within the layers 110 as well as inter-layers 110. The thermoplastic fibers 150 may be monolayer which soften and fuse under heat and pressure or may have a core layer and at least one skin layer. The skin layer preferably has a melting temperature lower than that of the core layer such that when the layers 110 are heated the skin layers at least partially melt and fuse the thermoplastic fibers 150 together to form the thermoplastic fiber reinforced member.

In some embodiments, the thermoplastic fibers 150 are monoaxially drawn, thermoplastic tape elements which may contain 1, 2, or more layers. A tape element, in one embodiment, is made up of a core layer disposed between skin layers. Alternatively, it is contemplated that only a single skin layer may be present, thereby resulting in a construction of a core layer being adjacent to one skin layer or that there are no surface layers on the tape elements meaning that the tape elements contain only a core layer. The tape element may be formed by any conventional means of extruding, slitting, and stretching such multilayer polymeric films formed by blown film or cast film extrusion followed by slitting into a multiplicity of longitudinal strips of a desired width and then drawing in order to increase the orientation of the core layer so as to provide increased strength and stiffness of the tape element.

It is contemplated that the core layer of the tape element is preferably made up of a molecularly-oriented thermoplastic polymer, the core layer being fusible to each of skin layer(s) at their respective intersections. The core layer is compatibly bonded to each of skin layer(s) between their contiguous surfaces. It is further contemplated that the skin layers have a softening temperature, or melting temperature, lower than that of the core layer. By way of example only, it is contemplated that the core layer is a polyolefin polymer such as polypropylene, polyethylene, polyester such as polyethyleneterephthalate, or a polyamide such as Nylon 6 or Nylon 6-6. According to one potentially preferred practice, the core layer may be polypropylene or polyethylene. The core layer may account for about 50-99% wt. of the tape element, while the skin layers account for about 1-50% wt. of the tape element. The core layer and skin layers being made up of the same class of materials to provide an advantage with regard to recycling, as the core layer may include production scrap.

In an embodiment with a core layer of polypropylene, the material of skin layers is preferably a copolymer of propylene and ethylene or an a-olefin. Particularly advantageous results have been achieved by using a random copolymer of propylene-ethylene. It may be preferred to use said copolymer with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the skin layers. It is also contemplated that materials such as poly-4-methyl-1-pentene (PMP) and polyethylene may be useful as a blend with such copolymers in the skin layers. The skin layer material should be selected such that the softening point of the skin layers is at least about 10° C. lower than that of the core layer, and preferably between about 15-40° C. lower. The upper limit of this difference is not thought to be critical, and the difference in softening points is typically less than 70° C. After the drawing process is complete, the tape elements are typically in the range of about 1.5 to about 5 millimeters wide. These tapes, fibers, and their textile layer constructions are believed to be more fully described in U.S. Patent Publication No. 2007/0071960 (Eleazer et al.) which is incorporated by reference.

In one embodiment, the covering layer of the multilayer fibers contains a high modulus, high viscosity polyolefin majority component and a low molecular weight, low viscosity polyolefin plastomer as a minority component. The high modulus, high viscosity component would provide the strength for reinforcement. The low molecular weight, low viscosity plastomer would reduce the viscosity of the mixture with little or no change to the modulus and improve the toughness by inducing co-crystallization with the majority component. The drop in viscosity would enable the composite textiles to be processed at lower temperatures (250 F) and pressures approaching vacuum bag conditions. This plastomer allows for consolidation at lower temperatures and/or pressures. More details about the low molecular weight, low viscosity additives and methods of applying the additives may be found in U.S. patent application Ser. No. 12/360,553 (Nair et al.) the contents of which are incorporated by reference.

Within the thermoplastic fiber reinforced member 100 of the fiber reinforced structural element 10, at least some of the thermoplastic fibers 150 within each layer 110 are fused (fused meaning thermally bonded) to other thermoplastic fibers 150 within the same layer 110 and at least some of the thermoplastic fibers 150 within each layer 110 are fused to thermoplastic fibers 150 within adjacent layers 110. This fusing (also referred to be adhesively connecting, bonding, and the like), occurs then the layers 110 are subjected to heat and optionally pressure and gives the thermoplastic fiber reinforced member 100 structural stability.

The fiber reinforced structural member 10 also contains a non-thermoplastic fiber reinforced member 300. The non-thermoplastic fiber reinforced member 300 has an upper surface 300a and a lower surface 300b. The non-thermoplastic fiber reinforced member 300 contains at least one layer 310 (preferably multiple layers), each of the layers containing non-thermoplastic fibers 350 and a hardened matrix 380. The non-thermoplastic fiber reinforced member 300 may contain any number of layers 310, depending on the end use application. A few as one or two layers 310 may be present or great than 100 layers may be present. In one embodiment, the non-thermoplastic fiber reinforced member 300 contains at least 2 layers 310, more preferably at least 5 layers, more preferably more than 10 layers. In another embodiment, the non-thermoplastic fiber reinforced member 300 contains more than 50 layers, more preferably more than 100 layers, more preferably between 10 and 100 layers 310. In another embodiment, the thickness of the non-thermoplastic fiber reinforced member 300 is between about 0.1 and 3 inches.

Each of the layers 310 in the non-thermoplastic fiber reinforced member 300 may be any suitable layer or textile, including a woven, non-woven, knit, or unidirectional as described above in regards to the textile layers for the thermoplastic fiber reinforced member 100. As will be understood by those of ordinary skill in the art, the fiber layers 310 in the member 300 can be independently provided in each of the aforementioned suitable constructions. For example, the non-thermoplastic fiber reinforced member 300 may have five (5) layers 310 in a knit construction and five (5) layers 310 in a woven construction. The different constructions may be grouped together, arranged in a repeating pattern or arranged randomly.

Each of the layers 310 in the non-thermoplastic fiber reinforced member 300 contains non-thermoplastic fibers 350 and a hardened matrix 380. The hardened matrix 380 at least partially surrounds the non-thermoplastic fibers 350 and adheres the non-thermoplastic fibers 350 within a layer 310 together as well as adheres the non-thermoplastic fibers 350 of adjacent layers 310 within the non-thermoplastic fiber reinforced member 300. In one embodiment, the non-thermoplastic fiber reinforced member 300 additionally contains thermoplastic fibers (a suitable list for which can be found above where the thermoplastic fibers for the thermoplastic fiber reinforced member 100 is described).

The non-thermoplastic fibers 350 may be any suitable non-thermoplastic fiber that does not contain a melting temperature including but not limited to thermosetting polymers and natural fibers and may contain one or more types of non-thermoplastic fibers. Suitable non-thermoplastic fibers include those made from rigid-rod polymers, such as lyotropic rigid-rod polymers, heterocyclic rigid-rod polymers, and thermotropic liquid-crystalline polymers. Suitable non-thermoplastic fibers made from lyotropic rigid-rod polymers include aramid fibers, such as poly(p-phenylene-terephthalamide) fibers (e.g., KEVLAR® fibers from DuPont of Wilmington, Del. and TWARON® fibers from Teijin of Japan) and non-thermoplastic fibers made from a 1:1 copolyterephthalamide of 3,4'-diaminodiphenylether and p-phenylenediamine (e.g., TECHNORA® fibers from Teijin of Japan). Suitable non-thermoplastic fibers include heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylene] fibers (PIPD fibers) (e.g., M5® fibers from DuPont of Wilmington, Del.). Suitable non-thermoplastic fibers include those made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable non-thermoplastic fibers also include boron fibers, silicon carbide fibers, alumina fibers, glass fibers, and carbon fibers. Non-thermoplastic fibers being natural fibers such as linen, ramie, and hemp; proteinaceous materials such as silk, wool, and other animal hairs such as angora, alpaca, and vicuna may also be used.

The non-thermoplastic fiber reinforced member 300 also contains a hardened matrix 380. The hardened matrix may be made of any matrix forming and hardening material. This includes resin that is infused into the member 300 then cured, matrix forming particles on the fibers 350, matrix forming coatings on the fibers 350, a matrix forming film within or between the layers 310. The matrix, in the final product is hardened, this hardening may be due to a thermoplastic polymer cooling and solidifying and hardening, a resin curing, or any other process which results in a hardened matrix.

In one embodiment, the matrix 380 is a thermoplastic matrix which may be any suitable thermoplastic polymer including but not limited to polyolefins such as polypropylene and polyethylene, polyurethane, polyamide, polysulfones, polyketones, polybutylene terephthalate, polycarbonate, poly lactic acid, polyester, and mixtures and co-polymers thereof.

In another embodiment, the matrix 380 is a thermoset matrix which comprises a thermoset polymer. The thermoset polymer can be one or more epoxy-based resin, polyester-based resin, phenolics, polyurethanes, vinyl-ester based resin, phenolic-based resin, and the like, preferably an epoxy resin. The thermoset polymer is typically subjected to heat and pressure to cure (chemically react) the resin. The cure is preferably slow at room temperature to prevent reactions that reduce tack, drape and shelf-life, but sufficiently rapid at elevated temperatures to permit reasonably short cure times. Additives can be used to change the viscosity of the uncured resin and to toughen the matrix to reduce brittleness. The epoxide or other reactive group can react chemically with other molecules to form a highly cross-linked three-dimensional network. This chemical reaction transforms the liquid resin into a structural load-bearing solid. The commonly used curing agents for epoxy systems for pre-preg systems are 4,4'-diaminodiphenylsulfone and dicyandiamide, although other amines, anhydrides, acids and many others can be used. When the thermoset matrix is processed, the matrix binds the fibers in the fiber layers 310 together maintaining the orientation and spatial position as it cures, by virtue of its cohesive and adhesive characteristics, and allows for efficient load transfer to and between the fibers.

Referring back to FIG. 1, the fiber reinforced structural element 10 also contains a multi-layer woven tie layer 200 (also sometimes referred to as a multi-ply woven tie layer) between the thermoplastic fiber reinforced member 100 and the non-thermoplastic fiber reinforced member 300. The multi-layer woven tie layer 200 has an upper surface 200a and a lower surface 200b and contains at least two plies 210 (a first woven ply 210 and a second woven ply 210) but may contain any suitable number of plies, including at least 3 plies, at least 4 plies and at least 5 plies.

Each of the woven plies 210 has a plurality of warp yarns in the warp direction (also sometimes referred to as the machine direction) and a plurality of weft yarns in a weft direction (also referred to as the filling direction, transverse direction, or cross-machine direction) which is perpendicular to the warp direction. Within each woven ply, the warp yarns and the weft yarns are interwoven. The woven plies 210 are integrated through (often pointwise) combined portions formed by interlacing warps and/or wefts of adjacent plies. The plies are integrated through combined portions, also called stitching points. These stitching points may be termed riser or sinker stiches depending on how the warp yarn is moved during manufacture of the textile.

Multi-ply woven textiles can be formed on a variety of different weaving machines. There is no limit to the theoretical textile complexity, but there can be mechanical, material, or practical limits to such textiles. Generally, the more complicated the desired multi-ply textile structure, the greater degree of shedding complexity is required. This has much to do with the amount of individual end control required to stitch the textile plies together into a single structure, as well as the layout and spacing of the desired stitching arrangement. Another general guideline is that simpler textiles can almost always be made on more complex weaving equipment, but typically with a speed and cost penalty.

At least some of the warp or weft yarns in the first woven ply 210 comprise thermoplastic fibers. These thermoplastic fibers may be selected from any thermoplastic fiber including those described in the thermoplastic fiber reinforced member section of the specification (including being tape elements). At least some of the warp or weft yarns in the second ply 210 (or last ply 210) comprise non-thermoplastic fibers. The upper surface 200a of the multi-layer woven tie layer 200 is predominately thermoplastic fibers and the lower surface 200b of the multi-layer woven tie layer 200 is predominately non-thermoplastic fibers. In one embodiment, the upper surface 200a of the multi-layer woven tie layer 200 contains greater than 50% thermoplastic fibers and the lower surface 200b of the multi-layer woven tie layer 200 contains greater than 50% non-thermoplastic fibers. In another embodiment, the upper surface 200a of the multi-layer woven tie layer 200 contains greater than 75% thermoplastic fibers and the lower surface 200b of the multi-layer woven tie layer 200 contains greater than 95% non-thermoplastic fibers. In another embodiment, the upper surface 200a of the multi-layer woven tie layer 200 contains greater than 95% thermoplastic fibers and the lower surface 200b of the multi-layer woven tie layer 200 contains greater than 50% non-thermoplastic fibers.

The first ply layer 210 forms the upper surface 200a of the tie layer 200. The tie layer 200 is oriented such that the upper surface 200a of the tie layer 200 is adjacent the upper surface 100a thermoplastic fiber reinforced member 100a. The second ply layer 210 (if there are only two plies 210 in the tie layer 200, else, the last ply layer 210) forms the lower surface 200b of the tie layer 200. The lower surface 200b of the tie layer 200 is adjacent the upper surface 300a of the non-thermoplastic fiber reinforced member 300.

Figure 4:
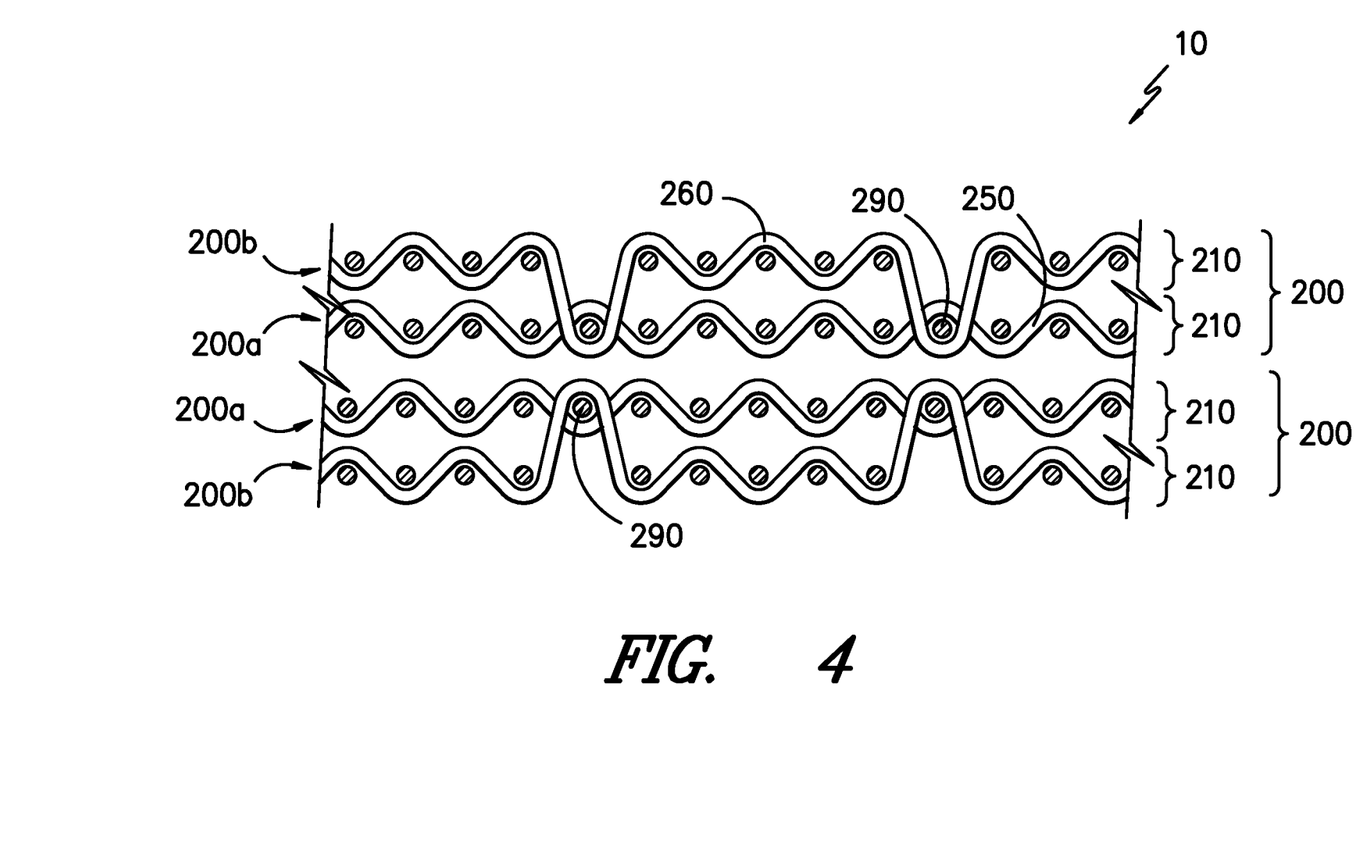
FIG. 4 is an illustration of a fiber reinforced structural element containing two multi-layer tie layers, but no thermoplastic fiber reinforced members or non-thermoplastic fiber reinforced members.

In one embodiment, shown in FIG. 4, the fiber reinforced structural element 10 contains two multi-layer tie layers 200, but no thermoplastic fiber reinforced members or non-thermoplastic fiber reinforced members. This may be preferred in applications where thickness must be kept to a minimum.

The first multi-layer woven tie layer 200 and second multi-layer tie layer 200 each an upper surface 200a and a lower surface 200b and contain at least a first woven ply 210 and a second woven ply 210. In this embodiment, the upper surface 200a of the first multi-layer woven tie layer 200 is adjacent the upper surface 200a of the second multi-layer woven tie layer 200. At least a portion of the thermoplastic fibers on the upper surface 200a of the first multi-layer tie layer 200 are fused to at least a portion of the thermoplastic fibers on the upper surface 200a of the second multi-layer tie layer 200.

The thermoplastic fiber reinforced member 100 and the non-thermoplastic fiber reinforced member 300 are connect and bonded together through the multi-layer woven tie layer 200 forming the fiber reinforced structural element in which at least a portion of the fibers are bonded to other fibers in adjacent layers throughout the structural element to form a structural element versus a collection of individual layers. Once the thermoplastic fiber reinforced member 100 and the non-thermoplastic fiber reinforced member 300 are consolidated and hardened, at least some of the thermoplastic fibers 150 of the thermoplastic fiber reinforced thermoplastic member 100 are fused to the thermoplastic fibers on the upper surface 200a of the multi-layer woven tie layer 200 and the hardened matrix 380 of the non-thermoplastic fiber reinforced member 300 at least partially extends around the non-thermoplastic fibers in the lower surface 200b of the multi-layer woven tie layer 200.

Figure 2:
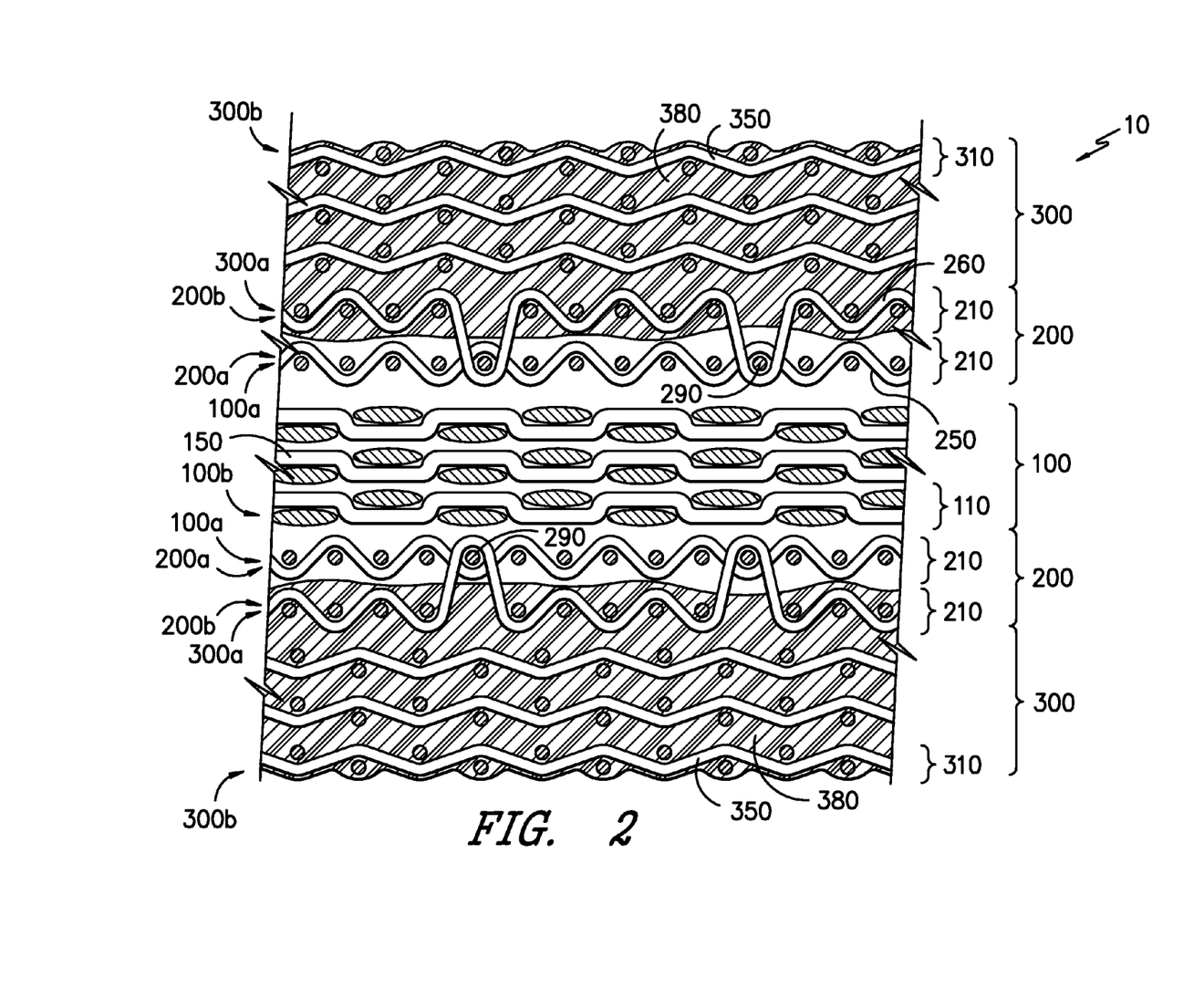
FIG. 2 is an illustration of one embodiment having a thermoplastic fiber reinforced member, two multi-layer woven tie layers, and two non-thermoplastic fiber reinforced members.

Referring now to FIG. 2, there is shown an additional embodiment of the fiber reinforced structural element 10 containing, in order a first non-thermoplastic fiber reinforced member 300, a first multi-layer woven tie layer 200, a thermoplastic fiber reinforced member 100, a second multi-layer woven tie layer 200, and a second non-thermoplastic fiber reinforced member 300.

In this embodiment, the upper surface 300a of the first non-thermoplastic fiber reinforced member 300 is adjacent the lower surface 200b of the first multi-layer woven tie layer 200, the upper surface 100a of the thermoplastic fiber reinforced member 100 is adjacent the upper surface 200a of the first multi-layer woven tie layer 200, the lower surface 100b of the thermoplastic fiber reinforced member 100 is adjacent the upper surface 200a of the second multi-layer woven tie layer 200, and the upper surface 300a of the second non-thermoplastic fiber reinforced member 300 is adjacent the lower surface 200b of the second multi-layer woven tie layer 200. The materials, processes, and interactions between layers are as they were described above in the 3 layer system.

Figure 3:
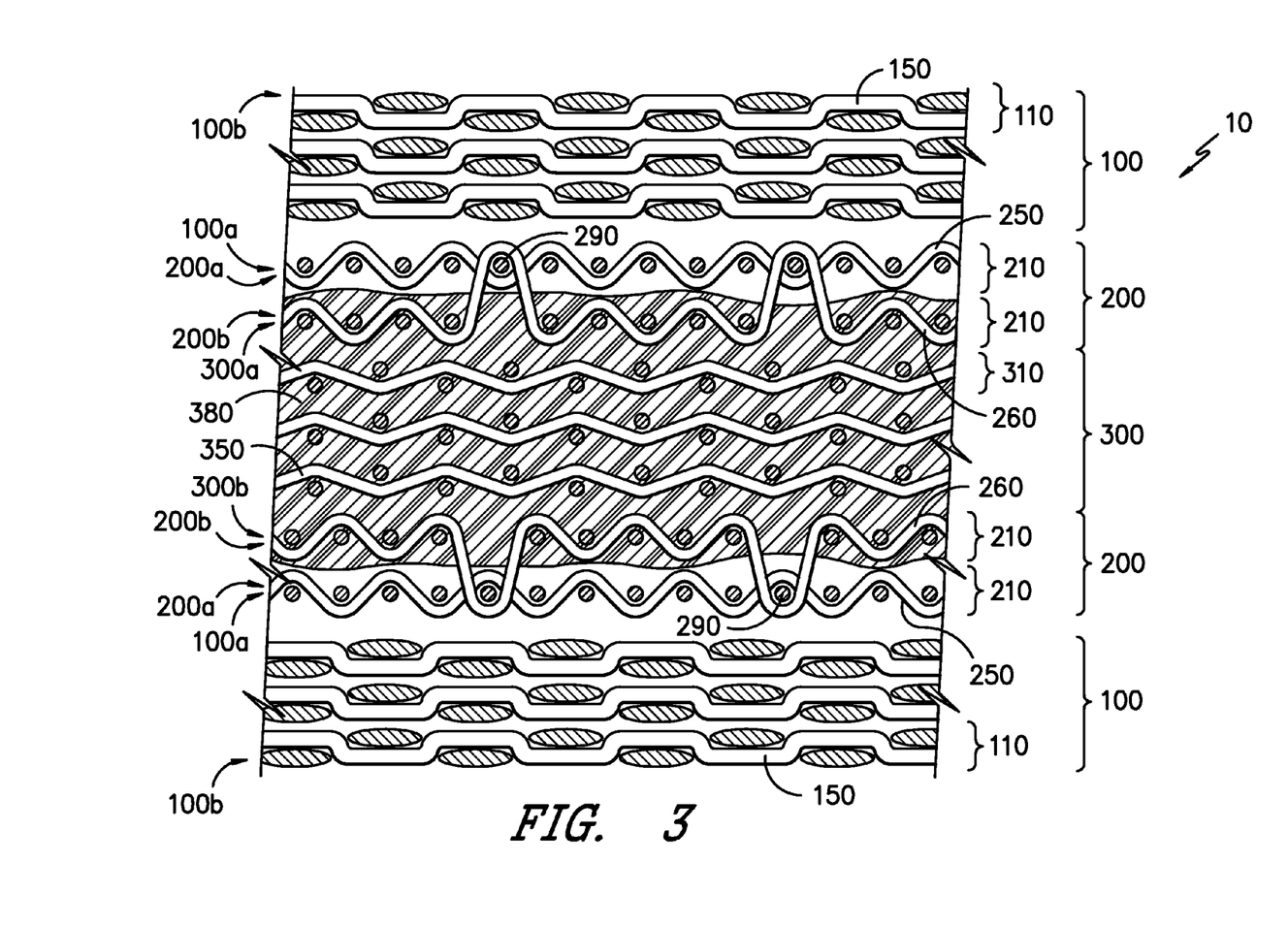
FIG. 3 is an illustration of one embodiment having two thermoplastic fiber reinforced members, two multi-layer woven tie layers, and a non-thermoplastic fiber reinforced member.

Referring now to FIG. 3, there is shown an additional embodiment of the fiber reinforced structural element 10 containing, in order a first thermoplastic fiber reinforced member 100, a first multi-layer woven tie layer 200, a non-thermoplastic fiber reinforced member 300, a second multi-layer woven tie layer 200, and a second thermoplastic fiber reinforced member 100.

In this embodiment, the upper surface 100a of the first thermoplastic fiber reinforced member 100 is adjacent the upper surface 200a of the first multi-layer woven tie layer 200, the upper surface 300a of the non-thermoplastic fiber reinforced member 300 is adjacent the lower surface 200a of the first multi-layer woven tie layer 200, the lower surface 300b of the thermoplastic fiber reinforced member 300 is adjacent the lower surface 200b of the second multi-layer woven tie layer 200, and the upper surface 100a of the second thermoplastic fiber reinforced member 100 is adjacent the upper surface 200a of the second multi-layer woven tie layer 200. The materials, processes, and interactions between layers are as they were described above in the 3 layer system.

Any suitable process or processes may be used to form the fiber reinforced structural element. The layers may be consolidated and hardened simultaneously or sequentially depending on the number of layers, materials, and end use.

In one embodiment, the layers (thermoplastic fiber reinforced member(s) 100, multi-layer woven tie layer(s) 200, and non-thermoplastic fiber reinforced member(s) 300) are consolidated simultaneously. The process begins by providing a grouping of at least one layer of thermoplastic fibers, providing a grouping of at least one layer of non-thermoplastic fibers and a matrix forming material, and placing a multi-layer woven tie layer having an upper surface and a lower surface between the grouping of at least one layer of thermoplastic fibers and the grouping of at least one layer of non-thermoplastic fibers. The multi-layer woven tie layer contains at least a first woven ply and a second woven ply, where the woven plies are integrated through combined portions formed by interlacing warps or wefts of adjacent woven plies. The upper surface 200a of the multi-layer woven tie layer 200 is predominately thermoplastic fibers 150 and the lower surface 200b of the multi-layer woven tie layer 200 is predominately non-thermoplastic fibers 350.

The layers 100, 200, 300 are arranged such that the upper surface 200a of the multi-layer woven tie layer 200 is adjacent the grouping of at least one layer of thermoplastic fibers, and wherein the lower surface of the multi-layer woven tie layer is adjacent the grouping of at least one layer of non-thermoplastic fibers.

Next, the grouping of at least one layer of thermoplastic fibers, the multi-layer woven tie layer, and the grouping of at least one layer of non-thermoplastic fibers are simultaneously cured under heat and optionally pressure to form the fiber reinforced structural element 10. The grouping of at least one layer of thermoplastic fibers form the thermoplastic fiber reinforced member 100 and the grouping of at least one layer of non-thermoplastic fibers form the non-thermoplastic fiber reinforced layer 300.

After consolidation, at least a portion of the thermoplastic fibers 150 within the thermoplastic fiber reinforced member 100 are fused to at least a portion of other thermoplastic fibers 150 within the thermoplastic fiber reinforced member 100. At least a portion of the thermoplastic fibers 150 within the thermoplastic fiber reinforced member 100 are fused to at least a portion of the thermoplastic fibers within the first woven layer 210 of the multi-layer woven tie layer 200. At least a portion of the matrix forming materials forms a matrix 380 in the non-thermoplastic fiber reinforced member 300 and adheres at least a portion of the non-thermoplastic fibers 350 of the non-thermoplastic fiber reinforced member together. At least a portion of the matrix 380 in the non-thermoplastic fiber reinforced member 300 adhere at least a portion of the non-thermoplastic fibers 350 of the non-thermoplastic fiber reinforced member 300 and at least a portion of the non-thermoplastic fibers within the second woven ply 210 of the multi-layer woven tie layer 200 together.

In another embodiment, first the thermoplastic fiber reinforced member 100 and multi-layer woven tie layer 200 may be formed and consolidated, then the non-thermoplastic fiber reinforced member may be added and cured/hardened in a second operation. In this process, the multi-layer woven tie layer 200 is placed such that the upper surface of the multi-layer woven tie layer is adjacent a grouping of at least one layer of thermoplastic fibers. The grouping of at least one layer of thermoplastic fibers and the multi-layer woven tie layer are consolidated under heat and optionally pressure. After consolidation, at least a portion of the thermoplastic fibers 150 within the thermoplastic fiber reinforced member 100 are fused to at least a portion of other thermoplastic fibers 150 within the thermoplastic fiber reinforced member 100 and at least a portion of the thermoplastic fibers 150 within the thermoplastic fiber reinforced member 100 are fused to at least a portion of the thermoplastic fibers within the first woven layer 210 of the multi-layer woven tie layer 200.

Next, a first grouping of at least one layer of non-thermoplastic fibers is provided such that the first grouping of at least one layer of non-thermoplastic fibers are adjacent the lower side 200b of the multi-layer woven tie layer 200. A matrix material is infused into the grouping of at least one layer of non-thermoplastic fibers 350, the matrix material 350 at least partially surrounding at least a portion of the non-thermoplastic fibers 350 of the grouping of at least one layer of non-thermoplastic fibers and at least a portion of the non-thermoplastic fibers of the second woven ply 210 of the multi-layer woven tie layer 200.

The matrix material is then hardened forming the matrix material 380 and forming the grouping of at least one layer of non-thermoplastic fibers into the non-thermoplastic fiber reinforced layer 300. A least a portion of the non-thermoplastic fibers 350 of the non-thermoplastic fiber reinforced member are adhered together and at least a portion of the non-thermoplastic fibers 350 of the first non-thermoplastic fiber reinforced member 300 are adhered to at least a portion of the non-thermoplastic fibers within the second woven ply 210 of the multi-layer woven tie layer 200. In another embodiment, the matrix material is a material already residing within the grouping of at least one layer of non-thermoplastic fibers and does not need to be infused in.

In another embodiment a five member structure (300, 200, 100, 200, 300) may be formed. This structure is shown in FIG. 2. One method to form this structure begins with having a thermoplastic fiber reinforced member 200 consolidated with tie-layers 200 (one on each side), then two non-thermoplastic fiber reinforced members 300 are formed on the tie layers 200 (on the side of the tie layers 200 opposite the thermoplastic fiber reinforced member 100). The method of forming the members 100, 200, 300 are similar those described above in the 3 member system.

In another embodiment, first the non-thermoplastic fiber reinforced member 300 and multi-layer woven tie layer 200 may be formed and cured/hardened, then the thermoplastic fiber reinforced member 100 may be added and consolidated in a second operation. In this process, the multi-layer woven tie layer 200 is placed such that the lower surface of the multi-layer woven tie layer is adjacent a grouping of at least one layer of non-thermoplastic fibers. The grouping of at least one layer of non-thermoplastic fibers and the multi-layer woven tie layer are cured/hardened (by a matrix material infused in or residing with the grouping of layers). After hardening, at least a portion of the non-thermoplastic fibers 350 within the non-thermoplastic fiber reinforced member 300 are fused/bonded to at least a portion of other non-thermoplastic fibers 350 within the non-thermoplastic fiber reinforced member 300 and at least a portion of the non-thermoplastic fibers 350 within the non-thermoplastic fiber reinforced member 300 are fused/bonded to at least a portion of the non-thermoplastic fibers within the second woven layer 210 of the multi-layer woven tie layer 200.

Next, a grouping of at least one layer of thermoplastic fibers is provided such that the grouping of at least one layer of thermoplastic fibers are adjacent the upper side 200a of the multi-layer woven tie layer 200. The grouping of at least one layer of thermoplastic fibers is then consolidated, forming the grouping into the thermoplastic fiber reinforced member 100.

After consolidation, at least a portion of the thermoplastic fibers 150 within the thermoplastic fiber reinforced member 100 are fused to at least a portion of other thermoplastic fibers 150 within the thermoplastic fiber reinforced member 100. At least a portion of the thermoplastic fibers 150 within the thermoplastic fiber reinforced member 100 are fused to at least a portion of the thermoplastic fibers within the first woven layer 210 of the multi-layer woven tie layer 200.

In another embodiment a five member structure (100, 200, 300, 200, 100) may be formed. This structure is shown in FIG. 3. One method to form this structure begins with having a non-thermoplastic fiber reinforced member 300 formed with tie-layers 200 (one on each side), then two thermoplastic fiber reinforced members 100 formed on the tie layers 200 (on the side of the tie layers 200 opposite the non-thermoplastic fiber reinforced member 300). The method of forming the members 100, 200, 300 are similar those described above in the 3 member system.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fiber reinforced structural element comprising:
   a) a first thermoplastic fiber reinforced member, wherein the thermoplastic fiber reinforced member comprises at least one layer of thermoplastic fibers, wherein at least some of the thermoplastic fibers within each layer are fused to other thermoplastic fibers within the same layer, and wherein at least some of the thermoplastic fibers within each layer are fused to thermoplastic fibers within adjacent layers;
   b) a first non-thermoplastic fiber reinforced member, wherein the non-thermoplastic fiber reinforced member comprises at least one layer of non-thermoplastic fibers and a hardened matrix at least partially surrounding the non-thermoplastic fibers,
   c) a first multi-layer woven tie layer having an upper surface and a lower surface and comprising at least a first woven ply and a second woven ply, each of the woven plies comprising warp yarns in the warp direction and weft yarns in a weft direction perpendicular to the warp direction interwoven with the warp yarns,
   wherein at least some of the warp or weft yarns in the first woven ply comprise thermoplastic fibers, wherein at least some of the warp or weft yarns in the second ply comprise non-thermoplastic fibers, wherein the woven plies are integrated through combined portions formed by interlacing warps or wefts of adjacent woven plies,
   wherein the upper surface of the multi-layer woven tie layer is predominately thermoplastic fibers and the lower surface of the multi-layer woven tie layer is predominately non-thermoplastic fibers, wherein the upper surface of the multi-layer woven tie layer is adjacent the thermoplastic fiber reinforced member, wherein the lower surface of the multi-layer woven tie layer is adjacent the non-thermoplastic fiber reinforced member,
wherein at least some of the thermoplastic fibers of the thermoplastic fiber reinforced thermoplastic member are fused to the thermoplastic fibers on the upper surface of the multi-layer woven tie layer and wherein the hardened matrix of the non-thermoplastic fiber reinforced member at least partially extends around the non-thermoplastic fibers in the lower surface of the multi-layer woven tie layer.

2. The fiber reinforced structural element of claim 1, wherein the thermoplastic fibers in the thermoplastic fiber reinforced member comprise polypropylene.

3. The fiber reinforced structural element of claim 1, wherein the non-thermoplastic fibers in the non-thermoplastic fiber reinforced member comprise carbon fibers.

4. The fiber reinforced structural element of claim 1, wherein the non-thermoplastic fibers in the non-thermoplastic fiber reinforced member comprise glass fibers.

5. The fiber reinforced structural element of claim 1, wherein the hardened matrix in the non-thermoplastic fiber reinforced member comprises an epoxy resin.

6. The fiber reinforced structural element of claim 1, wherein the thermoplastic fibers in the thermoplastic fiber reinforced member and the multi-layer woven tie layer comprise tape fibers.

7. The fiber reinforced structural element of claim 6, wherein the thermoplastic fibers in the thermoplastic fiber reinforced member and the multi-layer woven tie layer comprise multi-layered tape fibers.

8. The fiber reinforced structural element of claim 6, wherein the tape fibers comprise a base layer of a strain oriented olefin polymer disposed between covering layers of a heat fusible olefin polymer and wherein the covering layers are characterized by a softening temperature below that of the base layer.

9. The fiber reinforced structural element of claim 1, wherein the thermoplastic fiber reinforced member comprises at least 5 layers of thermoplastic fibers.

10. The fiber reinforced structural element of claim 1, wherein the non-thermoplastic fiber reinforced member comprises at least 5 layers of non-thermoplastic fibers.

11. The fiber reinforced structural element of claim 1, wherein the at least one layer of thermoplastic fibers is a woven layer.

12. The fiber reinforced structural element of claim 1, wherein the structural element further comprises:
   d) a second thermoplastic fiber reinforced member, wherein the second thermoplastic fiber reinforced member comprises multiple layers of thermoplastic fibers, wherein at least some of the thermoplastic fibers within each layer are fused to other thermoplastic fibers within the same layer, and wherein at least some of the thermoplastic fibers within each layer are fused to other thermoplastic fibers within adjacent layers; and,
   e) a second multi-layer woven tie layer having an upper surface and a lower surface and comprising at least a first woven ply and a second woven ply, each of the woven plies comprising warp yarns in the warp direction and weft yarns in a weft direction perpendicular to the warp direction interwoven with the warp yarns, wherein at least some of the warp or weft yarns in the first woven ply comprise thermoplastic fibers, wherein at least some of the warp or weft yarns in the second ply comprise non-thermoplastic fibers, wherein the woven plies are integrated through combined portions formed by interlacing warps or wefts of adjacent woven plies, wherein the upper surface of the second multi-layer woven tie layer is predominately thermoplastic fibers and the lower surface of the second multi-layer woven tie layer is predominately non-thermoplastic fibers, wherein the upper surface of the second multi-layer woven tie layer is adjacent the second thermoplastic fiber reinforced member, wherein the lower surface of the first multi-layer woven tie layer is adjacent the first non-thermoplastic fiber reinforced member,
wherein at least a portion of the thermoplastic fibers of the first thermoplastic fiber reinforced member are fused to the thermoplastic fibers on the upper surface of the first multi-layer woven tie layer, wherein at least a portion of the thermoplastic fibers of the second thermoplastic fiber reinforced member are fused to the thermoplastic fibers on the upper surface of the second multi-layer woven tie layer and wherein the hardened matrix of the first non-thermoplastic fiber reinforced member at least partially extends around the non-thermoplastic fibers in the lower surface of the first multi-layer woven tie layer and in the lower surface of the second multi-layer woven tie layer.

13. The fiber reinforced structural element of claim 1, wherein the structural element further comprises:
   d) a second non-thermoplastic fiber reinforced member, wherein the second non-thermoplastic fiber reinforced member comprises multiple layers of non-thermoplastic fibers and a hardened matrix at least partially surrounding the non-thermoplastic fibers,
   e) a second multi-layer woven tie layer having an upper surface and a lower surface and comprising at least a first woven ply and a second woven ply, each of the woven plies comprising warp yarns in the warp direction and weft yarns in a weft direction perpendicular to the warp direction interwoven with the warp yarns, wherein at least some of the warp or weft yarns in the first woven ply comprise thermoplastic fibers, wherein at least some of the warp or weft yarns in the second ply comprise non-thermoplastic fibers, wherein the woven plies are integrated through combined portions formed by interlacing warps or wefts of adjacent woven plies, wherein the upper surface of the second multi-layer woven tie layer is predominately thermoplastic fibers and the lower surface of the second multi-layer woven tie layer is predominately non-thermoplastic fibers, wherein the upper surface of the second multi-layer woven tie layer is adjacent the first thermoplastic fiber reinforced member, wherein the lower surface of the second multi-layer woven tie layer is adjacent the second non-thermoplastic fiber reinforced member,
wherein at least a portion of the thermoplastic fibers of the first fiber reinforced thermoplastic member are fused to the thermoplastic fibers on the upper surface of the first multi-layer woven tie layer, wherein at least a portion of the thermoplastic fibers of the first fiber reinforced thermoplastic member are fused to the thermoplastic fibers on the upper surface of the second multi-layer woven tie layer, wherein the hardened matrix of the first non-thermoplastic fiber reinforced member at least partially extends around the non-thermoplastic fibers in the lower surface of the first multi-layer woven tie layer, and wherein the hardened matrix of the second non-thermoplastic fiber reinforced member at least partially extends around the non-thermoplastic fibers in the lower surface of the second multi-layer woven tie layer.

14. A fiber reinforced structural element comprising:
a first multi-layer woven tie layer and a second multi-layer tie layer, each layer having an upper surface and a lower surface and comprising at least a first woven ply and a second woven ply, each of the woven plies comprising warp yarns in the warp direction and weft yarns in a weft direction perpendicular to the warp direction interwoven with the warp yarns,
wherein at least some of the warp or weft yarns in the first woven ply comprise thermoplastic fibers, wherein at least some of the warp or weft yarns in the second ply comprise non-thermoplastic fibers, wherein the woven plies are integrated through combined portions formed by interlacing warps or wefts of adjacent woven plies,
wherein the upper surface of the multi-layer woven tie layers is predominately thermoplastic fibers and the lower surface of the multi-layer woven tie layers is predominately non-thermoplastic fibers, wherein the upper surface of the first multi-layer woven tie layer is adjacent the upper surface of the second multi-layer woven tie layer, and wherein the at least a portion of the thermoplastic fibers on the upper surface of the first multi-layer tie layer are fused to at least a portion of the thermoplastic fibers on the upper surface of the second multi-layer tie layer.

\* \* \* \* \*